Dec. 5, 1950  A. S. BRUNJES ET AL  2,532,756
TOWER REACTOR
Filed Feb. 20, 1946
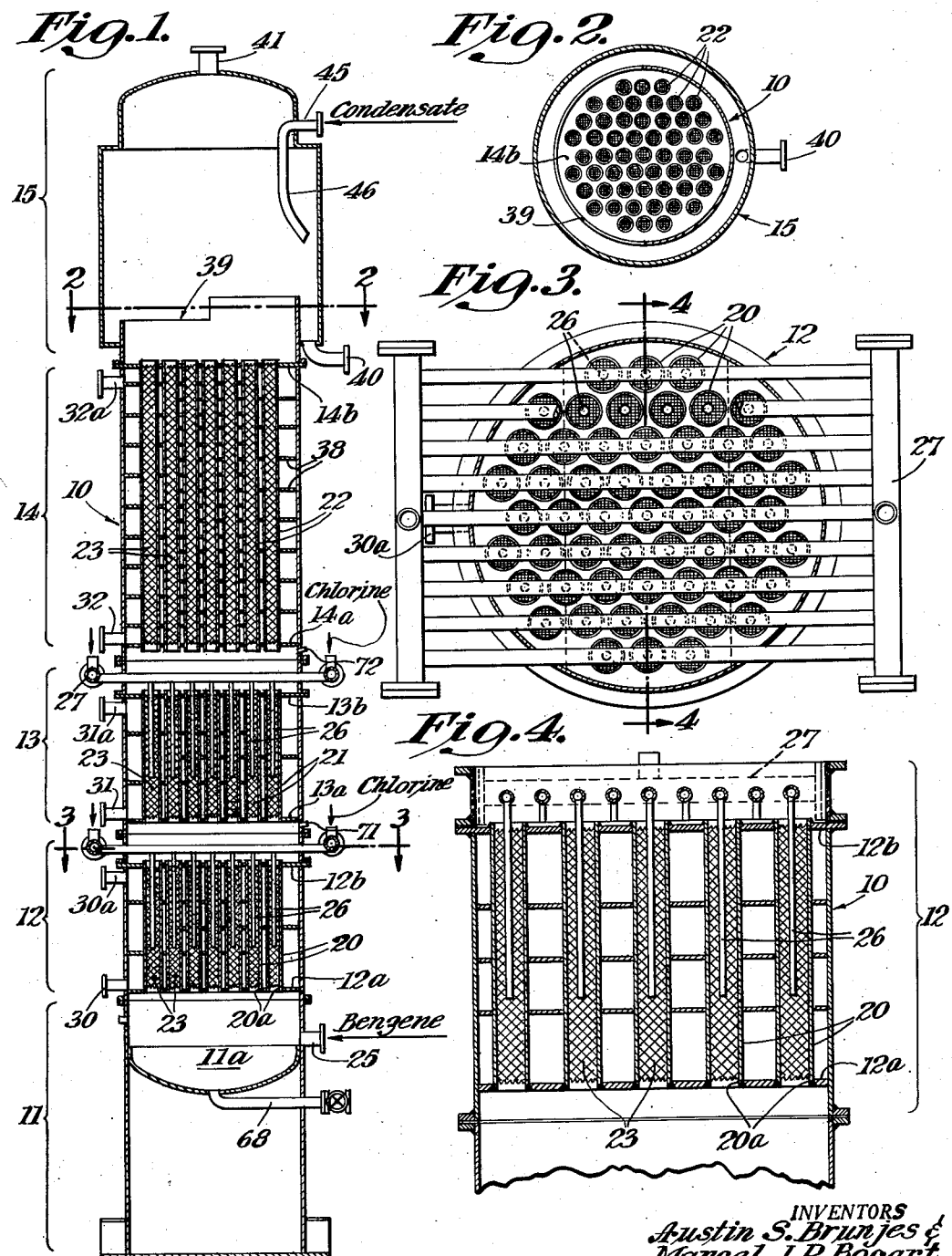
INVENTORS
Austin S. Brunjes &
Marcel J. P. Bogart
BY Nathaniel Ely
ATTORNEY Patented Dec. 5, 1950

2,532,756

UNITED STATES PATENT OFFICE 2,532,756

TOWER REACTOR

Austin S. Brunjes, Plandome, N. Y., and Marcel J. P. Bogart, Teaneck, N. J., assignors to The Lummus Company, New York, N. Y., a corporation of Delaware Application February 20, 1946, Serial No. 649,060

2 Claims. (Cl. 23—288)

This invention relates to an improved apparatus for carrying out the halogenation of an aromatic hydrocarbon and specifically relates to the chlorination of benzene. It is a continuation-in-part of our copending application, Serial No. 447,983, filed June 22, 1942, for "Halogenation of Aromatic Hydrocarbons," which issued February 26, 1946, as Patent No. 2,395,777. As is well known, chlorinated benzenes are commonly used as a base material in the production of many chemicals. More particularly, phenol and other products are obtained by the suitable conversion of monochlorbenzene. The chlorination of benzene to produce substantial yields of monochlorbenzene cannot be readily carried out, however, except by the most careful control of the conditions of the reaction, particularly the temperature, in order to prevent undue side reactions from taking place.

An important object of our present invention is to provide an improved apparatus for specifically controlling the reaction between chlorine and benzene whereby the maximum yield of monochlorbenzene and the minimum yield of polychlorbenzenes are obtained.

Further objects and advantages of our invention will appear from the following description of a preferred form of embodiment thereof taken in connection with the attached drawing, in which:

Fig. 1 is a vertical sectional view of the reaction vessel;

Figs. 2 and 3 are horizontal cross sections taken substantially on the line 2—2 and 3—3 of Fig. 1;

Fig. 4 is a vertical section on the line 4—4 of Fig. 3.

The reaction vessel 10 comprises a vertical series of sections. The lowest section 11 is the base or supporting section acting as the foundation for the entire vessel and contains the benzene feed chamber 11a having a benzene inlet 25. It is surmounted by several reaction sections, indicated at 12, 13 and 14. The uppermost section 15 may be termed the vapor disengaging section.

With a reaction such as halogenation of aromatic hydrocarbons, it is highly desirable to provide optimum temperature control at the zone of reaction, and we also find it desirable to provide for individual unit replacement of apparatus. For these reasons, the sections 12, 13 and 14 are independent, having tube sheets 12a, and 12b, 13a and 13b, and 14a and 14b, respectively, to which the reaction tubes 20, 21 and 22 are secured. These tubes are in alignment and provide for the desired flow of reactants as hereinafter described. Each tube is filled with a suitable catalyst and packing 23, which may consist of any suitable material such as ceramic or iron rings. We prefer to use Raschig rings or the like, and these may be treated with ferric chloride if desired.

A controlled inlet of the reactants (benzene and chlorine) to these tubes can be accomplished most successively according to our invention by bubbling the chlorine through a body of benzene. This may be accomplished by introducing the benzene as a liquid into tubes 20 and then feeding the chlorine as a gas under positive pressure into chamber 20a adjacent the bottom of the tubes 20 through inlets 26. Manifolds 27 may be used to interconnect all of the inlets 26, which are of equal length thereby assuring equal distribution of the gas.

The introduction of the mixture of benzene and chlorine into the lower part of the tubes 20 and the continuous movement of the reactants upward through the tubes 20 as well as the tubes 21 and 22 assure a complete and continuous reaction of the products. With the feed to reaction section 12, this section also becomes a feed section as well as reaction section.

The reaction sections 12, 13 and 14 are preferably so arranged within the reaction vessel 10 that a suitable cooling medium can be independently circulated about them in indirect heat exchange therewith. This is most important as the reaction is exothermic and it is necessary to regulate the temperature of the reaction and to prevent side reactions from taking place. In the formation of monochlorbenzene, the reaction is best accomplished at temperatures of 40 to 45° C., and above this excessive formation of polychlorbenzenes results. It is necessary precisely to control the cooling effect in the respective sections, as the separation of monochlorbenzene from polychlorbenzenes is also difficult and expensive.

We have found that although water is the cheapest cooling medium, a non-reactive coolant such as cooled monochlorbenzene itself is superior. It is to be understood that the possible leakage of water into the reaction zone would result in the formation of an acid solution (of the hydrogen chloride present) which is so highly corrosive to ordinary materials of construction as to immediately cause damage that is aggravated with time. Using monochlorbenzene from some other part of the process or storage assures no damage due to leakage.

Coolant inlet and discharge nozzles 30, 30a, 31, 31a, and 32 and 32a, provide for the desired cooling. Suitable manifolding may be provided, and coolant discharge nozzles 30a, 31a, and 32a, respectively, may be interconnected. For example, the coolant may pass through the upper reaction sections 13 and 14 in series. Suitable valves will be provided for regulating the flow of coolant and external means, not shown, will be used to remove the heat therefrom. Baffles 38 within the sections may also aid the suitable distribution of the cooling medium about the reaction tubes and the entire reaction zone surrounding the chambers 20a at the lower part of the tubes 20 is directly cooled.

It will generally be necessary to remove the largest amount of heat in the lowermost feed reaction section 12, and a close temperature control in this section is necessary. For this purpose, inlet 30 can be interconnected with a suitable temperature controller so that the flow of coolant through inlet nozzles 30 may be automatically controlled by the exit temperature of reaction section 12. The entire reaction tube area is surrounded by coolant for the quick and positive temperature control.

Benzene and chlorine reactants, as previously indicated, pass upwardly through the reaction tubes and come into contact with the packing therein. This packing provides for a substantially complete mixing of these reactants and also insures that the reactants come into intimate contact with each other. The reaction takes place, for the most part, in the lower portion of the reaction tubes, although the reaction tubes are sufficiently long so that the reaction is substantially complete by the time that the reactants have traversed the length of these tubes.

The mixture of reaction products discharged from the reaction tubes is partially in the liquid and partially in the vapor state. This reaction mixture consists of chlorbenzenes, unreacted benzene, and hydrogen chloride. The liquid portion of the reaction mixture is removed over weir 39 through nozzle 40. The vapor portion of the reaction mixture is removed from reaction vessel 10 through nozzle 41 and is passed to a condenser, not shown, wherein the vaporized benzene and chlorbenzene are condensed. The condensed material is separated from the uncondensed hydrogen chloride and the condensate may be returned through line 45 to the vapor chamber section 15. The uncondensed hydrogen chloride will be removed in its gaseous state to a suitable recovery system or the like. The condensate reintroduced into section 15 through nozzle 45 discharges through conduit 46 alongside of the wall of the zone 15 which is expanded in diameter not only to provide for the weir 39 but also to allow adequate vapor volume and prevent foaming and liquid carry over.

This arrangement materially aids in the recovery of the liquid product.

The liquid portion of the reaction mixture removed through nozzle 40 is passed to a suitable heater, not shown, wherein a portion of this liquid is heated to the neighborhood of the boiling point to remove as much hydrogen chloride as possible. The vaporized portion comprises hydrogen chloride together with some benzene and chlorbenzene vapors, and may be admixed with the vapors from line 41. The liquid portion may be removed as product.

We have found it preferable to fabricate reaction vessel 10 as an integrated unit as shown. In this manner, not only is a compact vessel provided, but the amount of space necessary for the equipment is materially reduced. As indicated, the bottom of the feed chamber section 11 may be provided with a suitable drain 68. Ordinarily, we find it desirable to operate the reaction section under a slight superatmospheric pressure.

It may be found desirable to introduce additional amounts of chlorine at intermediate points along the length of the reaction tubes thereby reducing the temperature of the reaction. This may be accomplished by introducing such material into the chambers 20a through perforated halogen inlet tubes 26 or by using the secondary reaction section 13 as a mixing section for the feed of a part of the halogen. The proportion of halogen to be introduced at section 12 as compared to section 13 will, of course, depend on the benzene flow rate, the temperature, and the nature of the reaction desired.

It is to be noted that the spacing between the tube sheets, and thus between the ends of the tubes, permits an equalization of flow of reactants through the tubes. Temperature controls 71 and 72 represented as temperature wells are also used in such chambers so that a careful temperature control can be maintained in all parts of the system.

Although we have shown and described a preferred form of embodiment of our invention, it will be understood that modifications may be made thereto; therefore, only such limitations as appear in the claims appended hereinafter should be made.

We claim:

1. Apparatus for conducting a reaction between a liquid and a gas, comprising an elongated vertically extending shell, vertically spaced transverse partitions dividing said shell into a plurality of superposed chambers, the lowermost one of said chambers forming a feed chamber for a liquid reactant, the chamber immediately above it forming a reaction chamber and the remaining chambers forming secondary reaction chambers and a vapor-disengaging chamber above the uppermost one of the reaction chambers, vertically extending transversely spaced tubes within each of said reaction chambers and fixed in the partitions forming the upper and lower ends of the chamber, a support in each of said tubes for a fixed bed of catalyst, a gas delivery manifold above the tubes of the lowermost reaction chamber, a plurality of gas-distributing conduits, substantially smaller than the reaction tubes, leading from said manifold and extending into the upper ends of the respective reaction tubes and downwardly along a major portion of the length thereof and opening thereinto, the tubes of the lowermost reaction chamber opening into the feed chamber to receive the liquid reactant therefrom, and means to pass a cooling medium in contact with the exterior of the tubes within each reaction chamber the intermediate adjacent ends of the tubes being in liquid communication.

2. Apparatus for conducting a reaction between a liquid and a gas, comprising an upstanding shell, vertically spaced transverse partitions dividing said shell into a feed chamber for a liquid reactant, a primary reaction chamber, a shallow chamber and a secondary reaction chamber in upward succession, vertically extending transversely spaced tubes within each of said reaction chambers and fixed in the partitions forming the upper and lower ends of the chamber, the tubes of both of said reaction chambers opening into said shallow chamber, a support in each of said tubes for a fixed bed of catalyst, a gas delivery manifold within said shallow chamber, a plurality of gas-distributing pipes substantially smaller than the reaction tubes, leading from said manifold and extending from the upper end of the respective reaction tubes of the primary reaction chamber downwardly along a major portion of the length of said tubes and opening thereinto and establishing a uniform gas flow to the lower ends thereof, the tubes of the lowermost reaction chamber opening into said feed chamber to receive the liquid reactant therefrom, and to permit contact at the lower part with the gas therein, said gas distributing pipes being spaced from the reaction tubes a sufficient amount to permit the reactants to pass upwardly therein and independent means to pass a heat exchange medium in contact with the exterior of the tubes within each reaction chamber.

AUSTIN S. BRUNJES.
MARCEL J. P. BOGART.

REFERENCES CITED

The following references are of record in the file of this patent:

UNITED STATES PATENTS

| Number | Name | Date |
|---|---|---|
| 1,915,077 | Wagner | June 20, 1933 |
| 2,298,593 | Rubin et al. | Oct. 13, 1942 |
| 2,385,200 | Friedel | Sept. 18, 1945 |